US008412678B2

(12) United States Patent
Wall et al.

(10) Patent No.: US 8,412,678 B2
(45) Date of Patent: Apr. 2, 2013

(54) SYSTEMS AND METHODS FOR PROVIDING BUSINESS CONTINUITY SERVICES

(75) Inventors: George B. Wall, Chapel Hill, NC (US); Jerry M. Overton, Wake Forest, NC (US); Geoffrey L. Sinn, Cary, NC (US); Paul S. Penny, Holly Springs, NC (US); Steven R. Bulmer, Cromwell, CT (US)

(73) Assignee: Strategic Technologies, Inc., Cary, NC (US)

( * ) Notice: Subject to any disclaimer, the term of this patent is extended or adjusted under 35 U.S.C. 154(b) by 0 days.

(21) Appl. No.: 12/883,899

(22) Filed: Sep. 16, 2010

(65) Prior Publication Data

US 2011/0191296 A1    Aug. 4, 2011

Related U.S. Application Data

(60) Provisional application No. 61/243,061, filed on Sep. 16, 2009.

(51) Int. Cl.
*G06F 17/00* (2006.01)

(52) U.S. Cl. ............... 707/639; 707/703; 714/5; 714/15; 709/217; 709/219

(58) Field of Classification Search .................. 707/695, 707/703, E17.005, 634, 639, 649, 674, E17.006, 707/E17.036, E17.124, E17.01; 714/2, 4, 714/5, 6, 7, 11, 15, E11.007, E11.113, E11.122; 705/35, 38; 709/217, 219, FOR. 120, FOR. 122
See application file for complete search history.

(56) References Cited

U.S. PATENT DOCUMENTS

| 6,697,960 | B1 * | 2/2004 | Clark et al. ..................... 714/15 |
| 6,721,764 | B2 * | 4/2004 | Hitz et al. ....................... 714/15 |
| 7,383,463 | B2 * | 6/2008 | Hayden et al. ............... 714/4.11 |
| 2003/0011087 | A1 * | 1/2003 | Kerfeld et al. ................. 711/161 |
| 2006/0179061 | A1 * | 8/2006 | D'Souza et al. ................. 707/10 |
| 2007/0094659 | A1 * | 4/2007 | Singh et al. ....................... 718/1 |
| 2007/0276951 | A1 * | 11/2007 | Riggs et al. .................... 709/229 |
| 2008/0263079 | A1 * | 10/2008 | Soneji et al. .................. 707/102 |
| 2009/0300409 | A1 * | 12/2009 | Bates et al. ....................... 714/5 |
| 2011/0191296 | A1 * | 8/2011 | Wall et al. ..................... 707/639 |
| 2011/0218968 | A1 * | 9/2011 | Liu et al. ....................... 707/649 |
| 2011/0289046 | A1 * | 11/2011 | Leach et al. .................. 707/602 |

OTHER PUBLICATIONS

Garner Research—"Business Continuity and Disaster Recovery Planning and Management: Perspective"—DPRO-100862, Kristen Noakes-Fry, Trude Diamond, Technology Overview, Oct. 8, 2001 (pp. 1-15).*
Sam R. Alapati and Charles Kim—"Data Guard"—Professional and Applied Computing—Oracle Database 11g—2007, (pp. 415-444), DOI: 10.1007/978-1-4302-0469-5_10.*
Murali Raman, Terry Ryan and Lorne Olfman—"Knowledge Management System for Emergency Preparedness: An Action Research Study"—Proceedings of the 39th Hawaii International Conference on System Sciences—2006—Jan. 4-7, 2006—vol. 2—(pp. 1-10).*

* cited by examiner

*Primary Examiner* — Anh Ly
(74) *Attorney, Agent, or Firm* — Faegre Baker Daniels LLP (57) ABSTRACT

Systems and methods for providing business continuity services after a disaster or other loss of data are provided. The system and methods include accessing, replicating, and storing customer data. In the event of a disaster or other loss of data, the stored data is used to create fully recovered systems. The systems and methods provide for a remote data center that offers protection against physical disasters. The systems and methods include providing a virtual recovered operating system environment identical to the source operating system environment in less than 8 hours after notification of a disaster.

4 Claims, 8 Drawing Sheets

SYSTEMS AND METHODS FOR PROVIDING BUSINESS CONTINUITY SERVICES

CROSS-REFERENCE TO RELATED APPLICATIONS

This application claims the benefit of U.S. Provisional Patent Application No. 61/243,061, filed Sep. 16, 2009, which is incorporated herein by reference.

BACKGROUND

1. Field of the Invention

The invention relates to methods and systems for providing business continuity services. More particularly, the invention relates to methods and systems for accessing, replicating, and storing customer data, and using the stored data to create fully recovered systems, applications and networks in the event of a disaster.

2. General Background

As computers' ability to process and store data improves and their prices drop, many companies today use computers in their businesses. At one end of the spectrum, even manual labor companies often use computers for order taking and invoicing. At the other end of this spectrum are internet businesses that exist solely on servers. In either scenario, access to data is key to the business's continuation.

Many back up solutions exist for computer users. These solutions often back up the user's data to an external hard drive or tape drive that is located at the user's place of business. In the event of a fire or a natural disaster, the user still loses that data. Other back up solutions include backing up the user's data to an online-based server. Online-based back up can mitigate the problem of complete data loss found in the first scenario. However, an online-based back up still includes problems because there may still be delays in the time it takes a business to function again. This problem remains because in the event of a fire or natural disaster, the software that uses the data may also be lost if the computer equipment is lost. Thus, the user must repurchase or otherwise obtain its software and computer equipment before it can make use of the data that can be recovered via the online-based back up.

Another problem with current back up and recovery solutions is that existing solutions required a significant amount of human input. Often someone must start the back up or at least schedule the back up and confirm that it occurred. This is particularly troublesome because existing back up and recovery solutions are overly complex, costly, and require specialization in hardware, software and skill sets.

Thus, a business continuity solution is needed that provides back up and recovery of computing services and eliminates the above-referenced challenges.

BRIEF SUMMARY OF THE INVENTION

Embodiments of the invention include a system for providing business continuity services after a disaster or other loss of data in which the system includes:

(a) at least one source server for executing a cloning process in which data volumes and server configuration files are cloned and for executing a replication process in which data volumes are replicated;

(b) at least one target server for mounting a read-only snapshot of the replicated data volumes;

(c) at least one conversion server for executing a conversion process to convert the replicated data volumes from a proprietary disk file type to a disk file type that can be recovered; and (d) a storage system for storing the converted disk files.

In some embodiments, a replication software controller controls the flow of replication data to the target server.

In certain embodiments, any of the target server, storage system and alternate computing resources are located at a remote data center. In other embodiments, the remote data center is a Tier IV, SAS70 certified data center.

In other embodiments, the replicated data undergoes CDP replication securely across a WAN cloud at the data block level to the target server.

In certain embodiments, cloning software is installed on the source server and the target server.

In other embodiments, the storage system includes a storage array provisioned so that the replicated data is stored in customer assigned volumes.

In some embodiments, the at least one conversion server executes a conversion process for converting the replicated data volumes from a "thick" disk file to a "thin" disk file.

In other embodiments, the "thick" disk file is deleted once the "thin" disk file has been stored on the storage system.

In certain embodiments, the system also includes:

(e) alternate computing resources for executing a virtualization process of the read-only snapshot, the converted disk files and cloned server configuration files to create at least one recovered server.

In certain embodiments, the system also includes at least one operator at a remote data center for receiving status notifications and monitoring the status of the cloning, replication, conversion, storage and virtualization processes.

Embodiments of the invention include a system for providing business continuity services after a disaster or other loss of data in which the system includes:

(a) at least one source server for executing a cloning process in which data volumes and server configuration files are cloned and for executing a replication process in which data volumes are replicated;

(b) a remote data center; and (c) at least one operator at the remote data center for receiving status notification and monitoring the status of the cloning, replication, conversion, storage and virtualization processes.

In certain embodiments of the invention, the remote data center is a Tier IV, SAS70 certified data center and the remote data center includes:

(a) at least one target server for mounting a read-only snapshot of the replicated data volumes;

(b) at least one conversion server for executing a conversion process to convert the replicated data volumes from a proprietary disk file type to a disk file type that can be recovered;

(c) a storage system for storing the converted disk files; and (d) alternate computing resources for executing a virtualization process of the read-only snapshot, the converted disk files and cloned server configuration files to create at least one recovered server.

In some embodiments, the invention includes a method for providing business continuity services after a disaster or other loss of data including:

(a) accessing data in an operating system environment;

(b) executing a cloning process in which the data is cloned;

(c) replicating the data to at least one target server;

(d) mounting a read-only snapshot of the replicated data to the target server;

(e) converting the replicated data to a disk file type that can be recovered;

(f) storing the read-only snapshot and converted data on a storage system.

In other embodiments of the invention, the method further includes:

(g) receiving notification of disaster or other loss of information at the operating system environment;
(h) executing scripts to create a snapshot copy of a data volumes on the storage system;
(i) importing and virtualizing cloned server configuration files;
(j) attaching the recoverable disk files and snapshot copy of a data volumes to create recovered servers;
(k) configuring network settings on the recovered servers to mirror a pre-disaster environment; and
(l) providing secure access to the recovered servers via a WAN cloud.

In certain embodiments, the recovered servers are located at a remote data center. In other embodiments, the remote data center is a Tier IV, SAS70 certified data center.

In certain embodiments, the recovered servers are provided within eight (8) hours of receiving notification of disaster or other loss of information at the operating system environment.

Further details and embodiments of the invention are set forth below. These and other features, aspects and advantages of the invention are better understood when the following Detailed Description of the Invention is read with reference to the accompanying drawings.

DETAILED DESCRIPTION OF THE INVENTION

This invention will now be described more fully with reference to the drawings, showing preferred embodiments of the invention. However, this invention can be embodied in many different forms and should not be construed as limited to the embodiments set forth.

Figure 1:
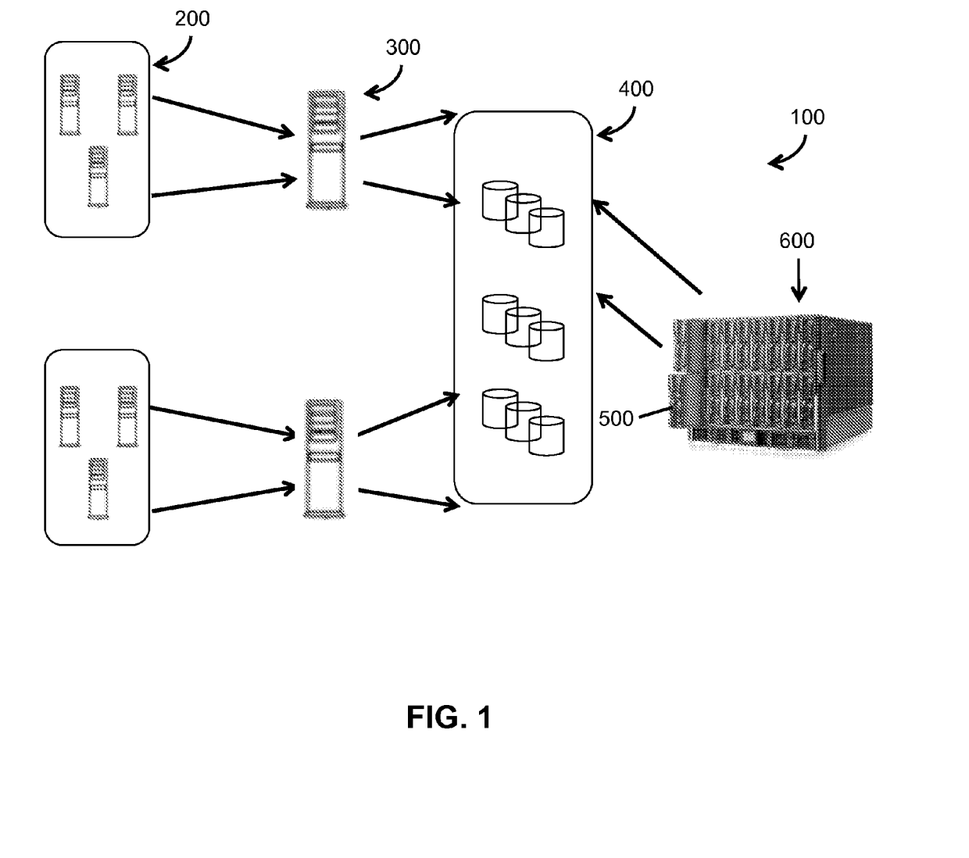
FIG. 1 is a block diagram of a system according to embodiments of the invention.

As shown in FIG. 1, in embodiments of the invention the system 100 includes at least one source server 200, at least one target server 300, a storage system 400, and alternate computing resources 600 including at least one conversion server 500.

Figure 2:
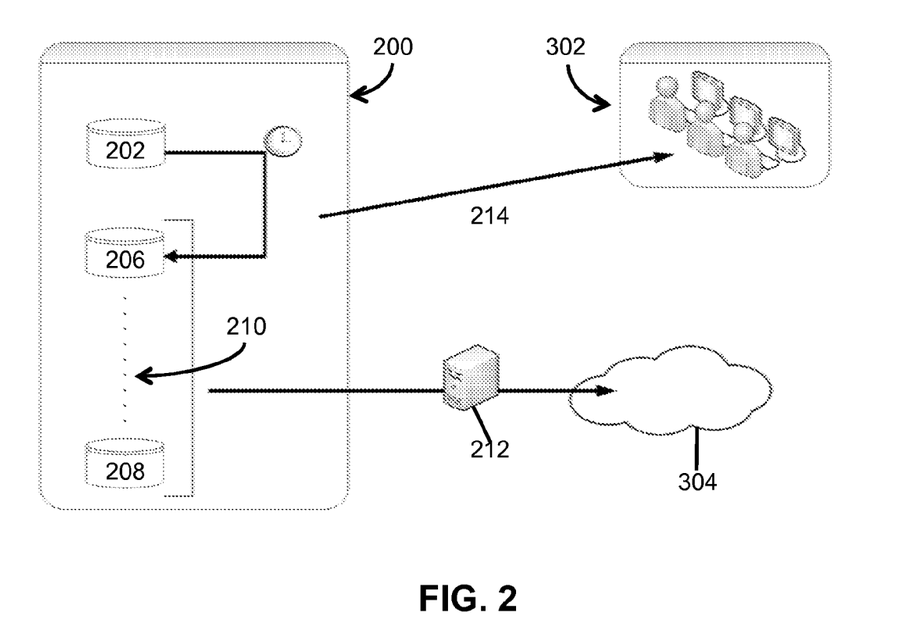
FIG. 2 is a block diagram of a portion of a system according to embodiments of the invention in which customer data is accessed, cloned and replicated.

FIG. 2 is a block diagram depicting a system in which customer data is cloned and replicated to a remote site according to embodiments of the invention. In general, in this phase of the system, the operating system environment 202 on a target server 300 at a customer site is cloned and the cloned images 206 and application data 208 are sent to a Tier IV data center target site.

The cloning of the operating system environment 202 may be effected using commercially available server cloning software, such as Acronis. In preferred embodiments of the invention, both the source server 200 and the target server 300 have a copy of the server cloning software. As shown in FIG. 2, the cloning software agent 218 executes pre and post scripts which execute automated status notifications 214 to operators at a remote data center 302. The operators at the remote data center 302 monitor the status of the system. The pre and post scripts also create control information trigger files.

The replication of the operating system environment 202 may be effected using commercially available replication software, such as InMage Scout. In preferred embodiments of the invention, both the source server 200 and the target server 300 have a copy of the replication software. As shown in FIG. 2, the replication software client 216 and the replication software controller 212 control the flow of replication data 210 to the target server 300 at a remote data center 302. The replicated data 210 may include the cloning software image files 206, protected data volumes 208 control information and downstream conversion process trigger files. This replicated data 210 undergoes CDP replication securely across a WAN cloud 304 at the data block level to a target server 300 at a remote data center 302.

In preferred embodiments of the invention, the replication software includes a source server agent, a replication control server and a target server agent. The source server agent is installed on each source server 200 at the customer location. The replication control server is a linux server meeting performance specifications and is installed at the customer location closest to the source servers. Preferably, at the remote data center 302, the target server 300 stores the replicated data 210 in customer assigned volumes 402 within the storage system 400.

In preferred embodiments of the invention, the storage system 400 includes a commercial storage array provisioned in a way that each customer is assigned their own volume 402. The volume is NFS accessible to the replication target and conversion hosts. The replication target and conversion hosts are virtualized servers on virtualization software. The storage system 400 facilitates specific software such as flexible volumes, in which a volume grows and shrinks, read-write snapshots and deduplication. Deduplication is run on the customer volume to reduce storage consumption on the storage system 400.

Figure 3:
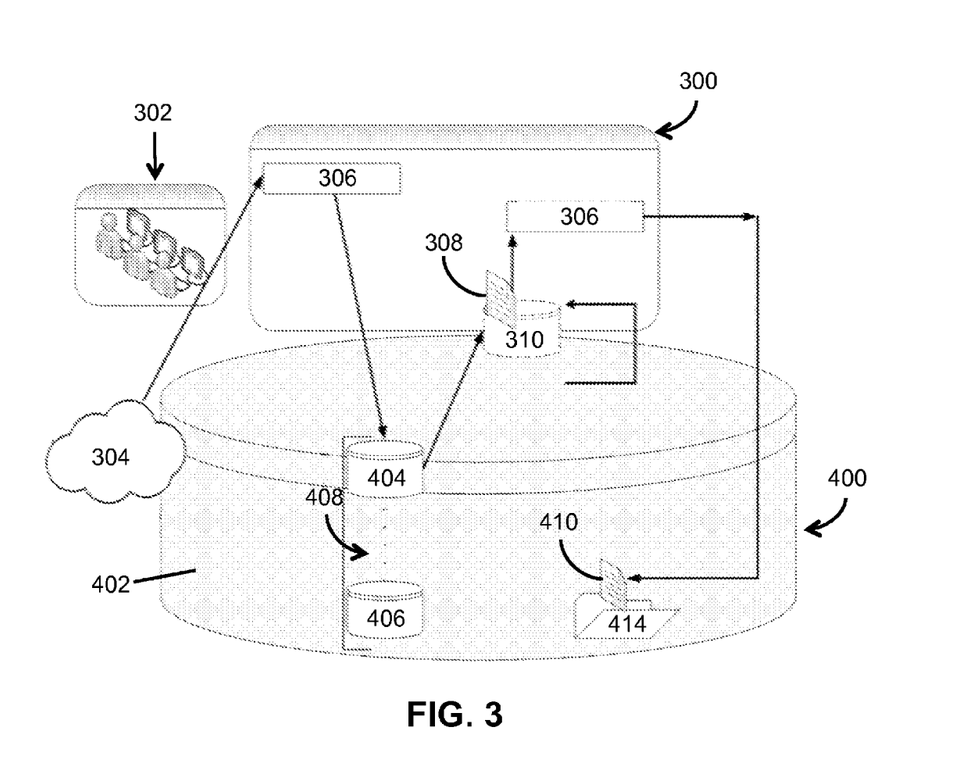
FIG. 3 is a block diagram of a portion of a system according to embodiments of the invention, in which the first step of a conversion process readies data for recovery.

FIG. 3 is a block diagram depicting the conversion process of a system according to embodiments of the invention. In this first step, the replicated data 210 is converted to an appropriate file type and readied for recovery. In a preferred embodiment of the invention, the conversion process is automated.

In the first step of the conversion process, control information from the imaging process triggers the mounting of a read-only snapshot of the replicated data 210. The read-only snapshot is mounted on the target server 300 in order to gain access to the replicated data 210. At this stage, the replicated data 210 is in a format proprietary to the cloning software used. For example, in a preferred embodiment of the invention, Acronis software is used to image the target operating system 202 and therefore the replicated data 210 is in a proprietary Acronis file format.

The cloning software may be used to convert the proprietary image file into an appropriate file format for the next phase of the system of the invention. In a preferred embodiment, cloning software tools are utilized to convert the proprietary file into a proprietary "thick" disk file 410. This converted "thick" disk file 410 is then stored in a shared storage system 400 at the remote data center 302.

Figure 4:
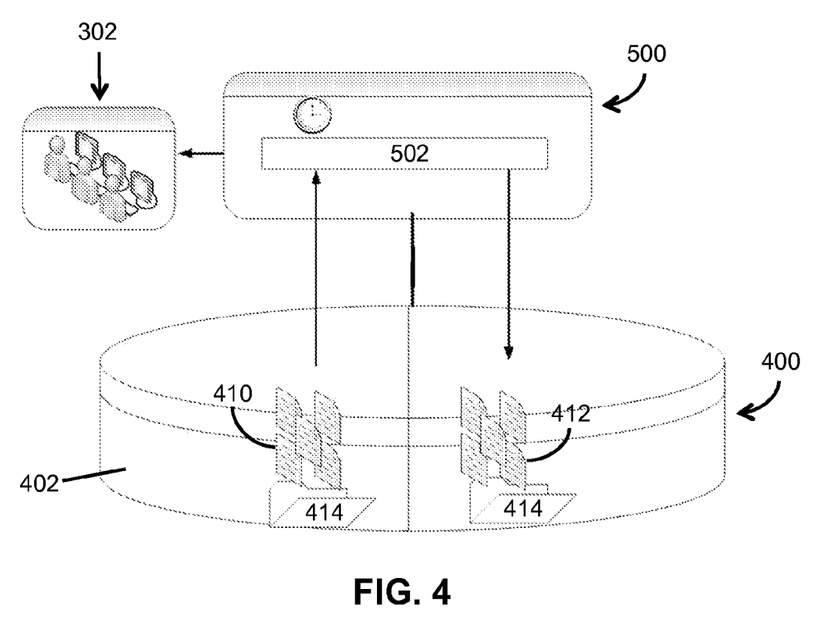
FIG. 4 is a block diagram of a portion of a system according to embodiments of the invention, in which the second step of a conversion process readies data for recovery.

In a second step of the conversion process, the replicated data 210 undergoes further conversion to ready the data for recovery. In preferred embodiments of the invention, key steps take place on a conversion server 500. First, a scheduled and automated conversion script executes daily to query the storage system looking for "thick" disk files 410 that need to be converted to "thin" disk files 412. This process is performed to reduce storage consumption on the storage system 400. Once "thick" disk files have been identified, a conversion script executes virtualization software utilities 502 on one or more conversion servers 500 and instructs the conversion servers to perform a "thick" oversized disk file 410 to "thin" smaller sized disk file 412 conversion for each "thick" disk file 410 needing conversion. In a preferred embodiment, the virtualization software utilities 502 reduce the size of the "thick" disk files 410 by removing 0 size blocks "white space" from the file and compression the file. This process may be performed to reduce space consumption on the storage system 400. The "thin" disk files 412 are stored until recovery of the files is needed due to a disaster or other data loss.

In a preferred embodiment, the conversion software used is VMware ESX. In other embodiments of the invention, as a final step in the conversion process, the "thick" disk files 410 are deleted from the target server 300 at the remote data center 302. Throughout this process, automated status notifications are triggered and sent to operators monitoring systems according to embodiments of the invention.

Figure 5:
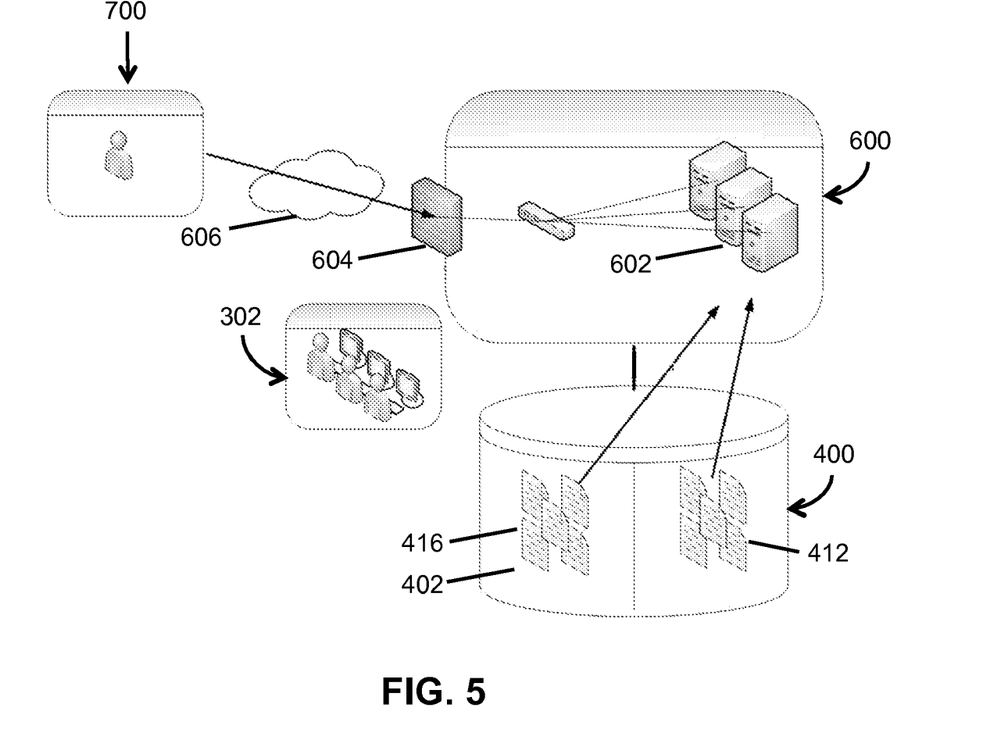
FIG. 5 is a block diagram of a portion of a system according to embodiments of the invention, in which an operating system environment is recreated using alternate computing resources.

In the event of a disaster recovery test exercise or a real disaster, as shown in FIG. 5, operators at the data center 302 execute scripts which create a snapshot copy of the protected data volumes 416 of the customer volume 402 on the storage system 400. The operators begin to import cloned server configuration files into the virtualization software 502, configure the network and attach "thin" disk files 412 and the snapshot copy of data volumes 416 stored on the storage system 400. In a preferred embodiment of the invention, the virtualization software 502 is installed on the alternate computing resources 600.

Operators power on and boot up the recovered servers 602, configure custom network settings on each server 602 and recover Windows active directory authentication servers. Networks are configured to mirror the customers production environment. This includes firewall rules and DNS nameserver reconfigurations. Operators will configure remote administrative methods using "Remote Desktop," SSL VPN or web access to the servers 602. Once all is verified as operational, the operators turn over the servers 602 to the customer 700 and the servers 602 are considered "production recovered servers." Customer 700 may then access the recovered servers 602 via the internet 606 through a firewall 604. During the recovery process, progress is communicated to the customer on an hourly basis by phone and tracked in service ticket.

In preferred embodiments of the invention, the target server 300, the storage system 400 and the alternate computing resources 600 are located in a Tier IV, SAS70 certified data center(s).

Figure 6:
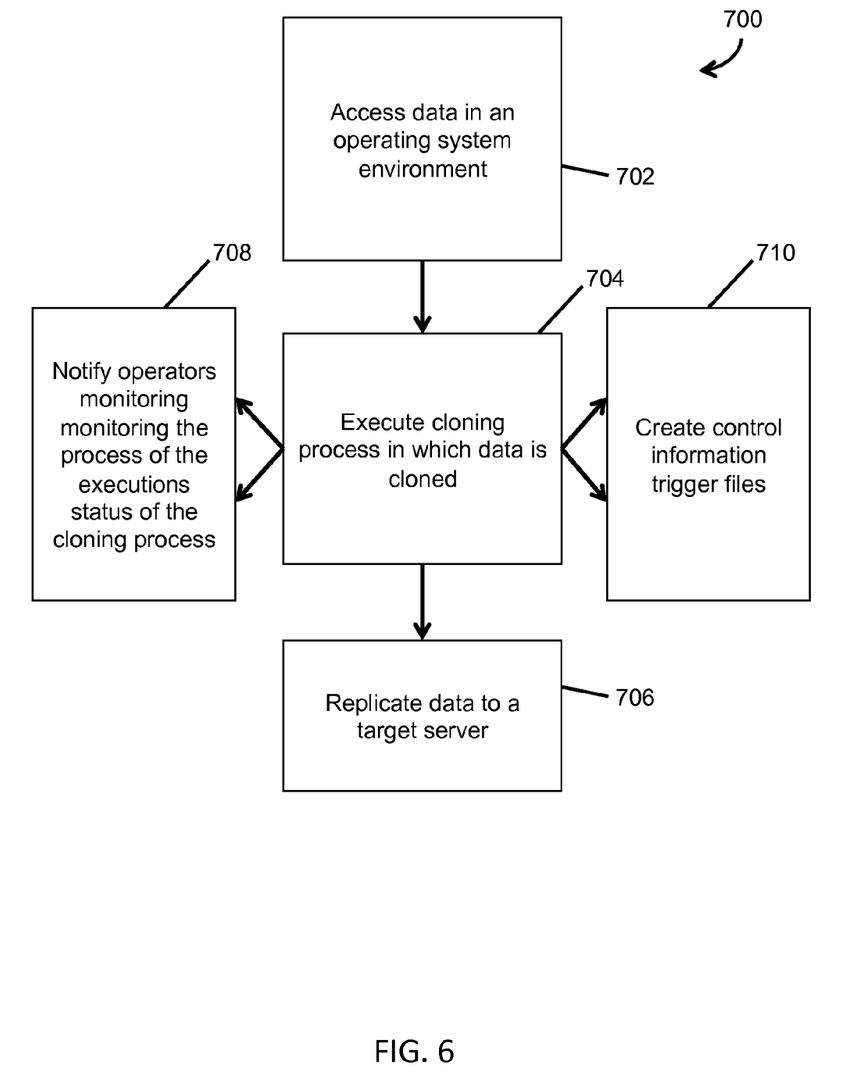
FIG. 6 is a flow chart of a method of accessing, cloning and replicating customer data according to embodiments of the invention.
Figure 7:
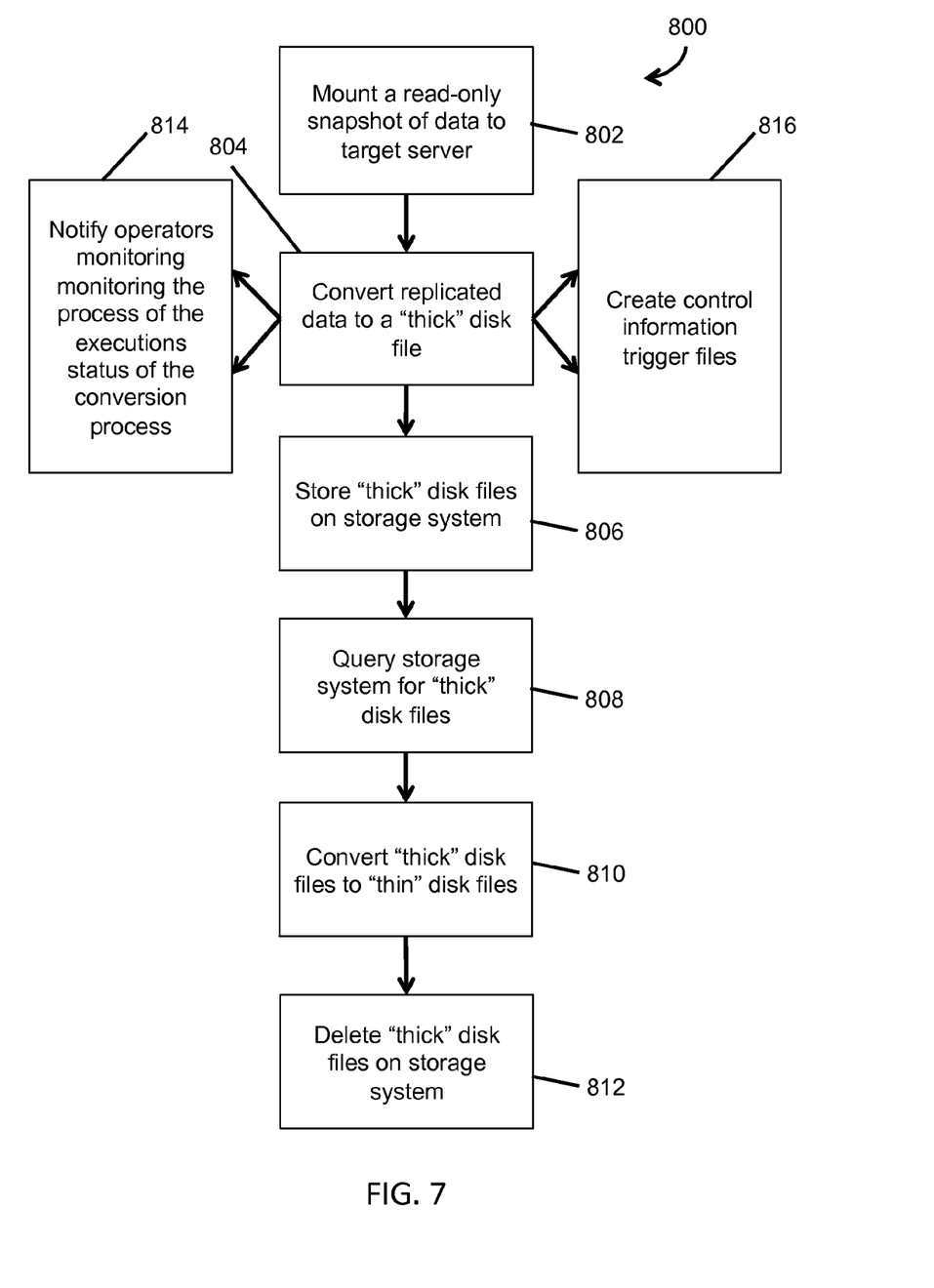
FIG. 7 is a flow chart of a method of converting and storing customer data according to embodiments of the invention.
Figure 8:
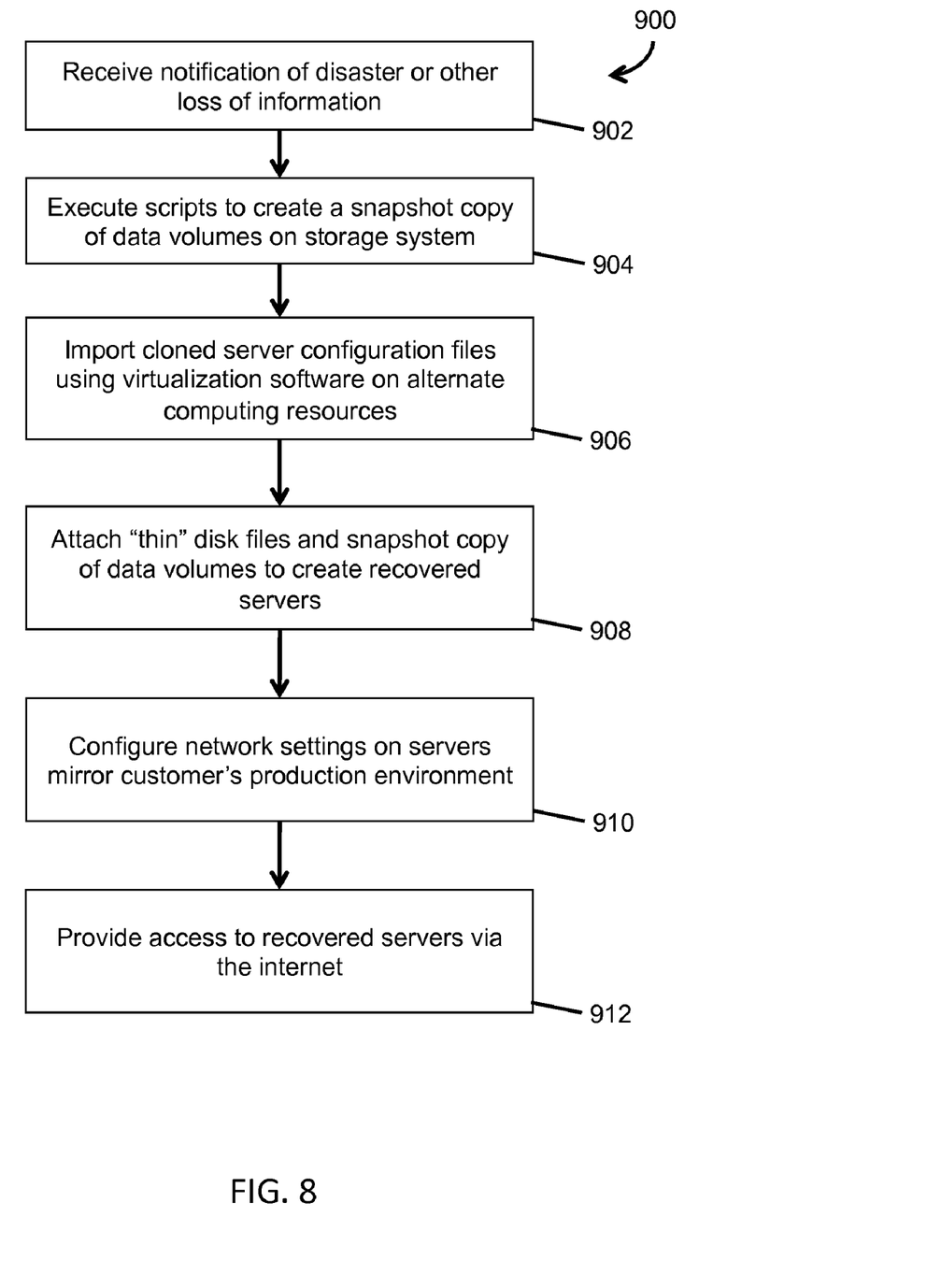
FIG. 8 is a flow chart of a method of using the stored data to create virtual operating systems according to embodiments of the invention.

Embodiments of the invention include a method, as shown in FIGS. 6-8 for cloning, replicating, converting, storing and recovering customer data. FIG. 6 is a flow chart illustrating a process 700 for cloning data. At step 702, data is accessed in an operating system. Preferably, the data is accessed using commercially available server cloning software. At step 704, the cloning process is executed and the data is cloned. Pre and post scripts are also executed by the cloning agent and thus, steps 708 and 710 are automated. At step 708, operators monitoring the process are notified of the execution status of the cloning process. At step 710, the pre and post scripts create control information trigger files. Commercially available replication software may be used to effect step 706, in which the data is replicated to a target server.

FIG. 7 is a flow chart illustrating a process 800 for converting the replicated data. At step 802, a read-only snapshot of the data is mounted to a target server. At step 804, the cloning software is used to convert the replicated data to a proprietary "thick" disk file. Pre and post scripts are also executed by the cloning agent and thus, steps 814 and 816 are automated. At step 814, operators monitoring the process are notified of the execution status of the conversion process. At step 816, the pre and post scripts create control information trigger files. At step 806, the "thick" disk files are stored on a storage system.

In the next part of the conversion process, the replicated data undergoes further conversion to ready the data for recovery. Using a scheduled and automated conversion script, at step 808, the storage system is queried at least daily looking for "thick" disk files. At step 810, the "thick" disk files are converted to "thin" disk files. As a final and optional step 812 in the conversion process, the "thick" disk files on the storage system may be deleted to reduce space consumption.

FIG. 8 is a flow chart illustrating a process 900 for recovering the data in the event of a disaster or other loss of information. At step 902, operators at a data center receive notification of a disaster or other loss of information. At step 904, the operators execute scripts to create a snapshot copy of data volumes on the storage system. At step 906, the operators import cloned server configuration files using virtualization software on alternate computing resources. The operators configure the network and attach the "thin" disk files and the snapshot copy of data volumes to create recovered servers at step 908. At step 910, the operators configure network settings on the recovered serves to mirror the customer's production environment. Finally, at step 912, the operators provide access to the recovered servers to the client via the internet.

Embodiments of the invention include providing a virtual recovered operating system environment identical to the customer's "destroyed" environment in less than 8 hours after notification of a disaster.

The foregoing description is provided for describing various embodiments and structures relating to the invention. Various modifications, additions and deletions may be made to these embodiments and/or structures without departing from the scope and spirit of the invention.

What is claimed is:

1. A method for providing business continuity services after a disaster or other loss of data comprising:
   (a) accessing data in an operating system environment;
   (b) executing a cloning process in which the data is cloned;
   (c) replicating the data to at least one target server;
   (d) mounting a read-only snapshot of the replicated data to the target server;
   (e) converting the replicated data to a disk file type that can be recovered;
   (f) storing the read-only snapshot and converted data on a storage system;
   (g) receiving notification of disaster or other loss of information at the operating system environment;

(h) executing scripts to create a snapshot copy of a data volumes on the storage system;
(i) importing and virtualizing cloned server configuration files;
(j) attaching the recoverable disk files and snapshot copy of a data volumes to create recovered servers;
(k) configuring network settings on the recovered servers to mirror a pre-disaster environment; and
(l) providing secure access to the recovered servers via a Wide Area Network (WAN) cloud.

2. The method of claim 1 wherein the recovered servers are located at a remote data center.

3. The method of claim 2 wherein the remote data center is a Tier IV, SAS70 certified data center.

4. The method of claim 1 wherein the recovered servers are provided within eight (8) hours of receiving notification of disaster or other loss of information at the operating system environment.

* * * * *